UNITED STATES PATENT OFFICE.

ERVIN L. MULLINS AND WILLIAM R. COLLIER, OF CANTON, TEXAS.

OINTMENT.

1,411,577.  Specification of Letters Patent.  Patented Apr. 4, 1922.

No Drawing.  Application filed February 23, 1921.  Serial No. 447,280.

*To all whom it may concern:*

Be it known that we, ERVIN L. MULLINS and WILLIAM R. COLLIER, citizens of the United States, residing at Canton, in the county of Van Zandt and State of Texas, have invented certain new and useful Improvements in an Ointment, of which the following is a specification.

This invention relates to an ointment for general external application, and its object is to provide a composition of matter for use as an ointment.

In preparing the composition we prefer to use the ingredients in about the following proportions, and to compound the same substantially as hereinafter set forth.

The body of the composition comprises chloride of zinc, powdered metallic cobalt, blood root, and gylcerine which produces a paste. In compounding the ointment we use one ounce of chloride of zinc, one ounce of a metallic cobalt, one ounce of blood root and a sufficient quantity of glycerine to form a paste or ointment.

Having thus described our invention, what we claim as new and desire to secure by Letters Patent of the United States, is as follows:

A composition of matter comprising substantially equal parts of chloride of zinc, metallic cobalt, blood root, and a quantity of glycerine sufficient to form a paste.

In testimony whereof, we affix our signatures.

ERVIN L. MULLINS.
WILLIAM R. COLLIER.